No. 787,655. PATENTED APR. 18, 1905.
C. F. ANTHONY.
CHURN.
APPLICATION FILED AUG. 25, 1904.
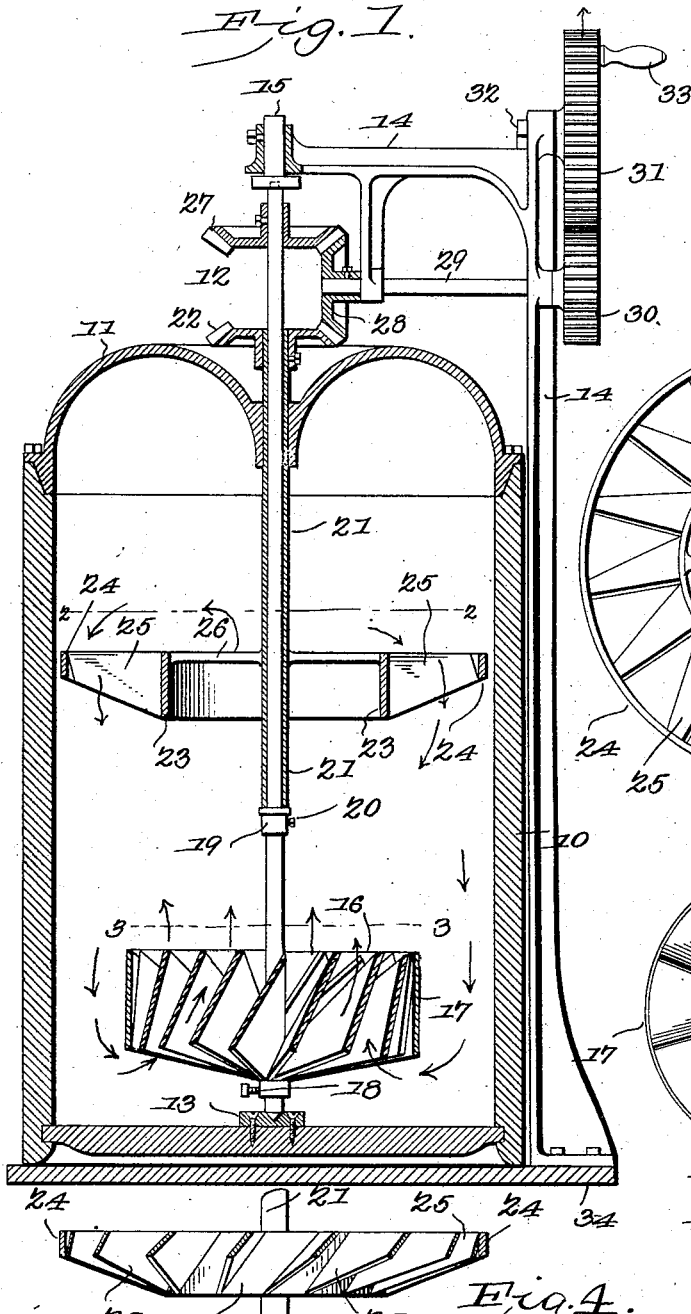
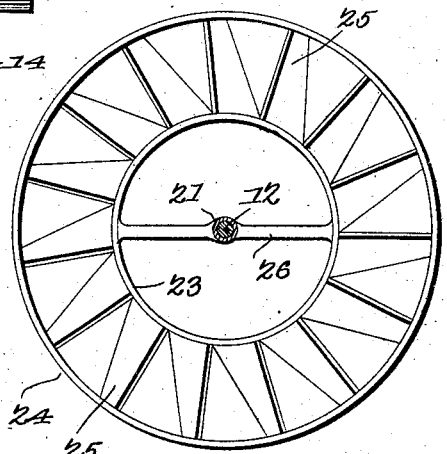
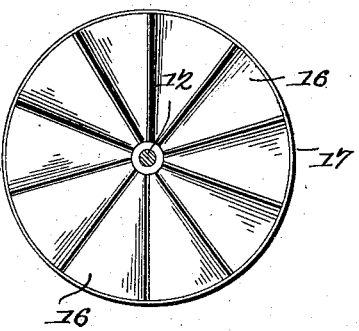
Charley F. Anthony, Inventor.

No. 787,655.

Patented April 18, 1905.

UNITED STATES PATENT OFFICE.

CHARLEY FREMONT ANTHONY, OF ELY, IOWA.

CHURN.

SPECIFICATION forming part of Letters Patent No. 787,655, dated April 18, 1905.

Application filed August 25, 1904. Serial No. 222,198.

*To all whom it may concern:*

Be it known that I, CHARLEY FREMONT ANTHONY, a citizen of the United States, residing at Ely, in the county of Linn and State of Iowa, have invented a new and useful Churn, of which the following is a specification.

This invention relates to churns, and has for its object to simplify the construction and increase the efficiency of devices of this class.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a sectional side elevation. Fig. 2 is a transverse section on the line 2 2 of Fig. 1. Fig. 3 is a transverse section on the line 3 3 of Fig. 1. Fig. 4 is a side elevation with the outer rim in section and the upper dasher member detached.

The cream-receptacle 10 may be of any required size, form, or capacity and is supported upon a base 34 and provided with a cover 11, curving downwardly centrally and also at the outer edge, so that the cream when moved upwardly at the center will be deflected by contact with the cover and thrown downwardly again near the sides, as hereinafter explained.

Mounted for rotation within the receptacle 10 is a shaft 12, stepped by its lower end in a plate 13 on the bottom of the receptacle and supported at the upper end above the receptacle by a bracket or standard 14, rising from the base 34, the standard having a detachable bushing 15 to carry the shaft, so that the bearing may be quickly and cheaply renewed when worn or broken.

Attached to the shaft 12 rotatively near its lower end is a dasher member formed of a plurality of inclined radiating blades 16, preferably connected at the outer ends by an annular rim 17, the dasher connected to the shaft, as by a set-screw 18 through its hub and bearing against the shaft.

Supported rotatively, as by a collar 19, which is held rigidly upon the shaft 12 by a set-screw 20, is a sleeve 21, the sleeve loose upon the shaft and passing centrally through the cover member 11 and provided on its upper end outside the cover with a bevel-gear 22.

Attached to the sleeve 21, adjacent to the under side of the cover 11, is a dasher member formed of spaced annular rims 23 24, connected by spaced radiating inclined blades 25, the inner rim 23 spaced from the sleeve connected to the same by relatively small arms 26.

The shaft 12 is provided with a bevel-gear 27 upon its upper end, and engaging the two gears 22 27 is another bevel-gear, 28, upon a shaft 29, mounted for rotation in the standard 14. A pinion 30 is supported upon the shaft 29 and engaged by a gear 31 on a stub-shaft 32, extending from the standard, the gear having an operating crank-handle 33. By this simple means it is obvious that when the gear 31 is rotated in the direction of the arrow in Fig. 1 the shaft 12 and sleeve 21 will be rotated in opposite directions and at accelerated speed caused by the difference in size between the gear 31 and pinion 30. By this means it will be noted that the cream in the receptacle will be drawn inwardly and moved rapidly upward through the central open space in the upper dasher member by the action of the lower dasher member and impinged against the curved top 11 and thence carried outwardly and turned downwardly and carried rapidly thence to the bottom of the casing again by the action of the inclined and reversely-revolving blades 25 of the upper dasher member. The cream is thus caused to be constantly and rapidly moved upwardly centrally of the receptacle and downwardly with equal celerity adjacent to the outer walls of the same, thereby rapidly and constantly circulated and agitated, with the result of very quickly and thoroughly separating the butter particles from the cream.

The parts will preferably be of metal suitably galvanized or otherwise coated or protected and may be of any desired size or capacity.

Having thus described the invention, what is claimed is—

1. In a churn, the combination with a cream-receptacle, of a lower and an upper dasher member mounted for rotation in opposite directions within said receptacle; said lower dasher member comprising a hub and radiating inclined blades for moving the contents of the receptacle in an inward and upward direction; and said upper dasher member comprising concentric annular rims spaced from each other and from the axial supporting member, and inclined blades mounted between said rims for moving the contents of the receptacle in an outward and downward direction.

2. In a churn, the combination with a cream-receptacle, of a lower and an upper dasher member mounted for rotation in opposite directions upon a vertical axis; the upper dasher member being of annular form and spaced from the axial supporting means; and the lower dasher member comprising a hub and inclined blades for moving the contents of the receptacle in an upward direction through the eye of the upper dasher member.

In testimony that I claim the foregoing as my own I have hereto affixed my signature in the presence of two witnesses.

CHARLEY FREMONT ANTHONY.

Witnesses:
J. H. CROSBY,
WM. L. CROSE.